United States Patent
Rubner

(10) Patent No.: US 11,421,648 B2
(45) Date of Patent: Aug. 23, 2022

(54) ROTOR BLADE OF A WIND TURBINE ROTOR, WIND TURBINE AND METHOD FOR IMPROVING THE EFFICIENCY OF A WIND TURBINE ROTOR

(71) Applicant: Wobben Properties GmbH, Aurich (DE)

(72) Inventor: Florian Rubner, Aurich (DE)

(73) Assignee: Wobben Properties GmbH, Aurich (DE)

( * ) Notice: Subject to any disclaimer, the term of this patent is extended or adjusted under 35 U.S.C. 154(b) by 87 days.

(21) Appl. No.: 16/636,868

(22) PCT Filed: Aug. 7, 2018

(86) PCT No.: PCT/EP2018/071340
§ 371 (c)(1),
(2) Date: Feb. 5, 2020

(87) PCT Pub. No.: WO2019/030205
PCT Pub. Date: Feb. 14, 2019

(65) Prior Publication Data
US 2020/0370534 A1    Nov. 26, 2020

(30) Foreign Application Priority Data
Aug. 7, 2017    (DE) .................. 10 2017 117 843.0

(51) Int. Cl.
*F01D 1/06*    (2006.01)
*F03D 1/06*    (2006.01)

(52) U.S. Cl.
CPC ......... *F03D 1/0675* (2013.01); *F03D 1/0658* (2013.01); *F05B 2230/60* (2013.01); *F05B 2240/21* (2013.01); *F05B 2240/304* (2020.08)

(58) Field of Classification Search
CPC .... F03D 1/0641; F03D 1/0675; F03D 1/0683; F03D 1/0658; F05B 2240/304; F05B 2240/21; F05D 2240/21
See application file for complete search history.

(56) References Cited

U.S. PATENT DOCUMENTS

| 8,448,527 | B2 | 5/2013 | Frere et al. |
| 9,366,222 | B2 | 6/2016 | Nielsen et al. |
| (Continued) | | | |

FOREIGN PATENT DOCUMENTS

| CN | 104884790 A | 9/2015 |
| CN | 106536920 A | 3/2017 |
| (Continued) | | |

OTHER PUBLICATIONS

Heinzelmann, "Strömungsbeeinflussung bei Rotorblättern von Windenergieanlagen mit Schwerpunkt auf Grenzschichtabsaugung", Jun. 23, 2011, 106 pages (with an English summary on p. 4).
International Standard, "DIN EN 61400-1 (VDE 0127-1)", Aug. 2011, 106 pages (with a one page English Abstract).

*Primary Examiner* — David E Sosnowski
*Assistant Examiner* — Maxime M Adjagbe
(74) *Attorney, Agent, or Firm* — Seed Intellectual Property Law Group LLP

(57) ABSTRACT

A rotor blade having a rotor blade trailing edge which extends between a rotor blade root and a rotor blade tip over a rotor blade length, and having a profile depth which is established between the rotor blade trailing edge and a rotor blade leading edge. For the purpose of improving efficiency, at least one profile element having a continuous profile section, for the purpose of changing the profile depth of the rotor blade, is able to be attached at or in the region of the rotor blade trailing edge, wherein the extension of the profile section beyond the rotor blade trailing edge is determined in a manner dependent on a standardized load-dependent (Continued)

dimensioning of the profile depth of the rotor blade and a load level which is established at an erection location of the wind turbine.

13 Claims, 5 Drawing Sheets

(56) References Cited

U.S. PATENT DOCUMENTS

| | | |
|---|---|---|
| 9,512,815 B2 | 12/2016 | Bae |
| 10,077,757 B2 | 9/2018 | Kannenberg et al. |
| 10,082,129 B2 | 9/2018 | Altmikus |
| 2008/0107540 A1 | 5/2008 | Bonnet |
| 2012/0141269 A1 | 6/2012 | Giguere et al. |
| 2014/0072441 A1 | 3/2014 | Asheim et al. |
| 2014/0286784 A1* | 9/2014 | Singh ............... F03D 1/0683 416/228 |
| 2017/0072441 A1* | 3/2017 | Bhushan ............... B09B 3/00 |
| 2017/0204832 A1 | 7/2017 | Kamruzzaman et al. |
| 2018/0274518 A1 | 9/2018 | Spieth et al. |

FOREIGN PATENT DOCUMENTS

| | | |
|---|---|---|
| DE | 102012109718 A1 | 4/2013 |
| DE | 102013202881 A1 | 8/2014 |
| DE | 102013204637 A1 | 9/2014 |
| DE | 102013204879 A1 | 9/2014 |
| DE | 102015116634 A1 | 4/2017 |
| EP | 3002452 A1 | 4/2016 |
| EP | 2572102 B1 | 12/2016 |
| EP | 3176425 A1 | 6/2017 |
| RU | 2545106 C1 | 3/2015 |
| RU | 2580193 C2 | 4/2016 |
| RU | 2588311 C2 | 6/2016 |

* cited by examiner

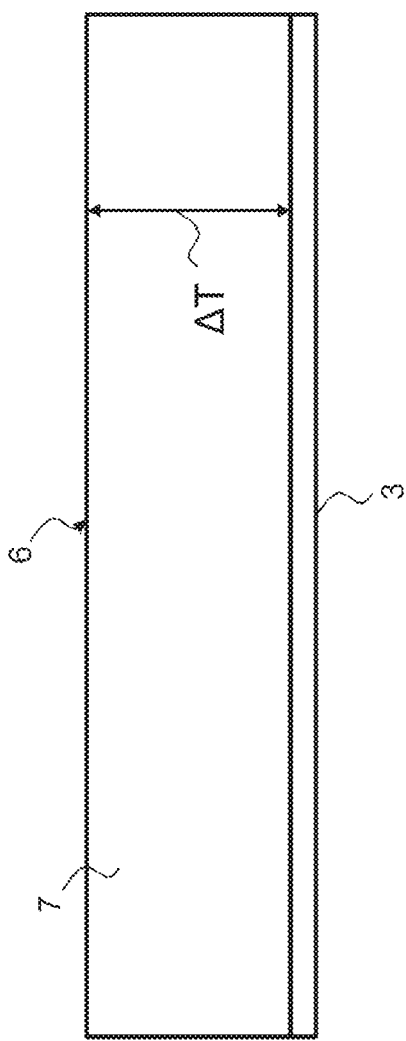
Fig. 3a
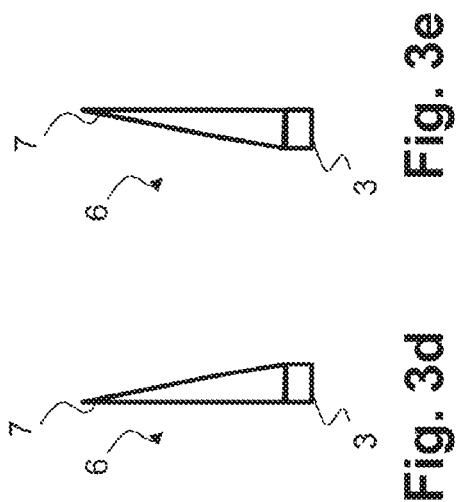
Fig. 3b
Fig. 3c
Fig. 3d
Fig. 3e

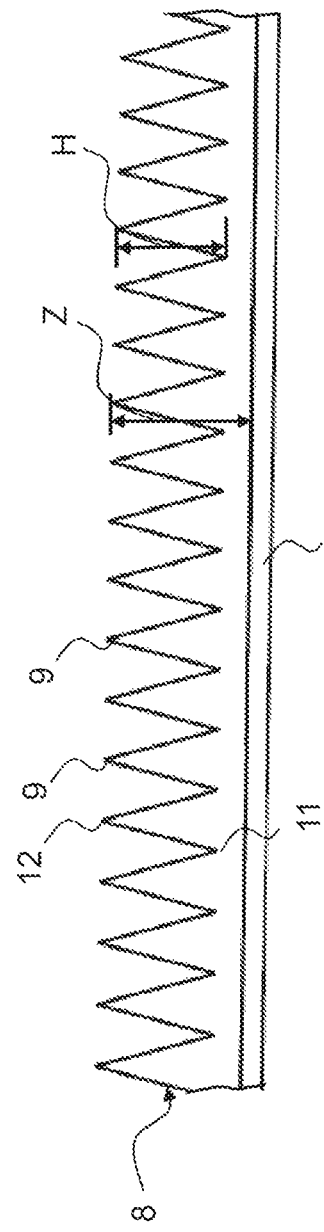
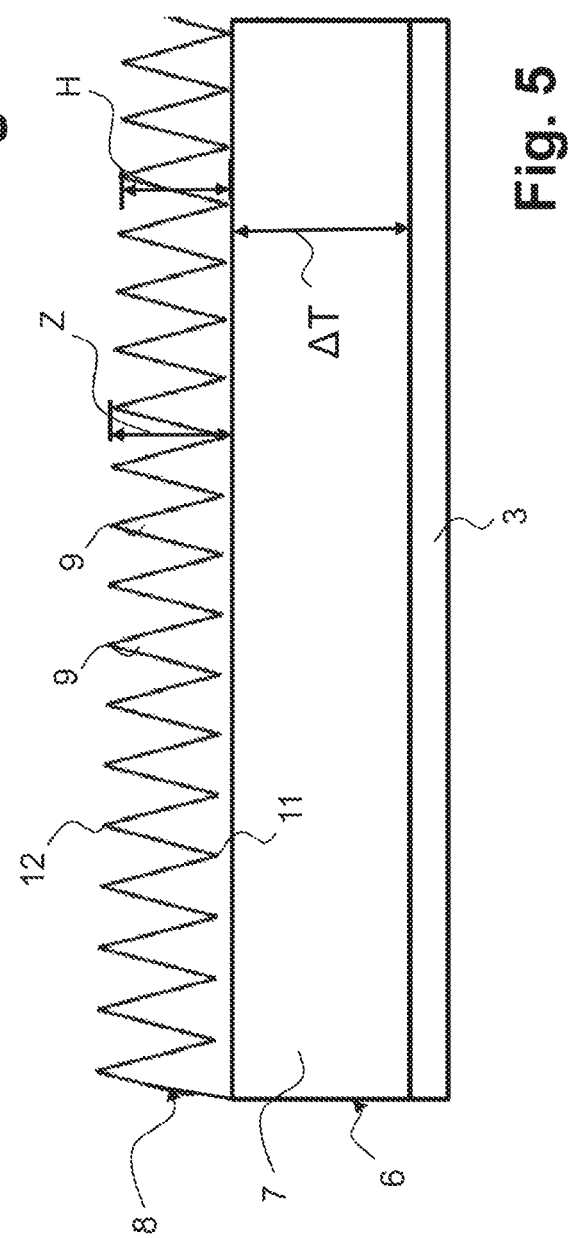

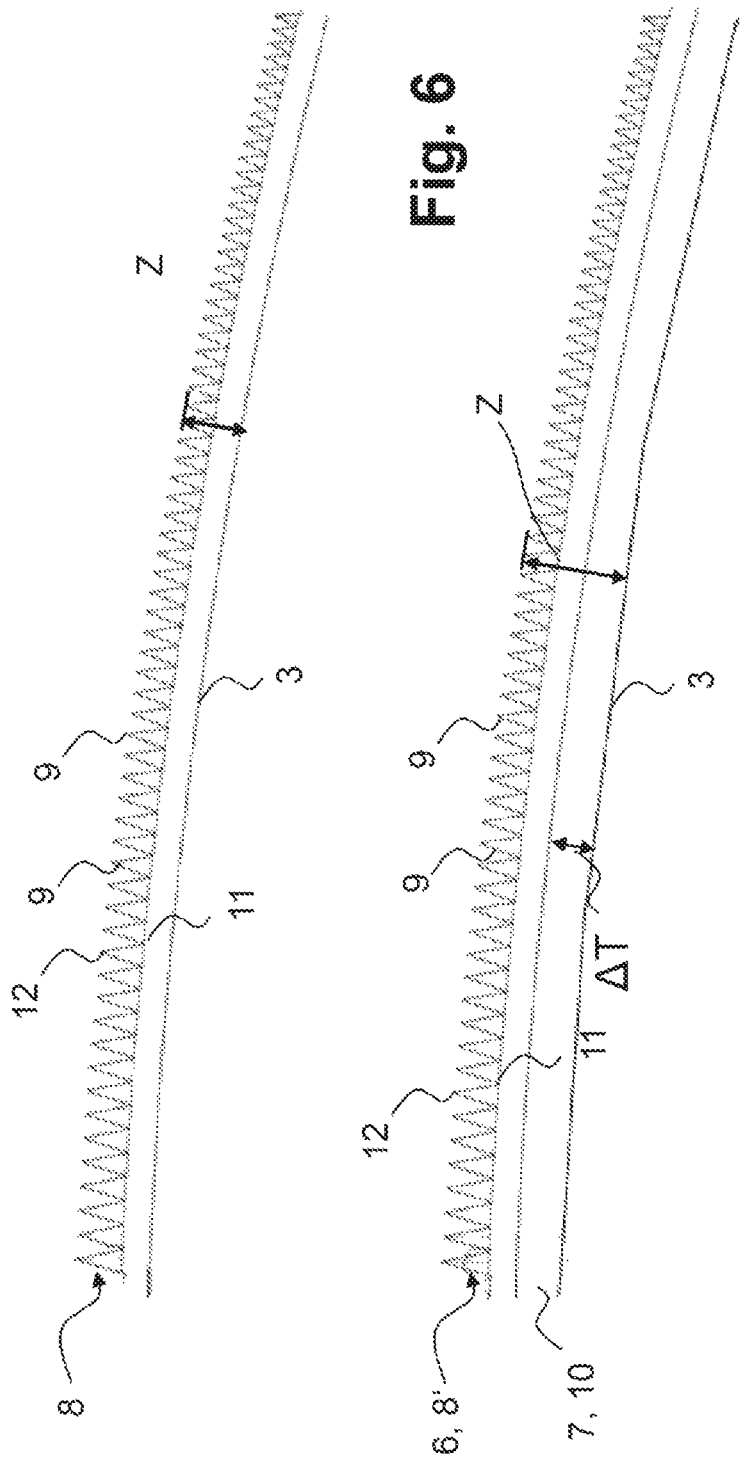

ROTOR BLADE OF A WIND TURBINE ROTOR, WIND TURBINE AND METHOD FOR IMPROVING THE EFFICIENCY OF A WIND TURBINE ROTOR

BACKGROUND

Technical Field

The invention relates to a rotor blade of a rotor of a wind turbine, and to a wind turbine. The present invention also relates to a method for improving the efficiency of a rotor of a wind turbine.

Description of the Related Art

Wind turbines are generally known and are designed for example as in FIG. 1. The design of wind turbines or their components is realized on the basis of standardized guidelines (for example IEC 61400), which relate to the main design requirements for ensuring the technical integrity of wind turbines. The purpose of this standard is to provide for an appropriate level of protection against damage arising from risks during the planned lifetime of the wind turbine. In this case, standard parameters are involved in the dimensioning of the wind turbine, which dimensioning is dependent on a standardized load but is not location-specific. The standard parameters are inter alia shear, the occurrence of turbulence, climatic conditions, air density, and reference speeds for wind classes and wind zones. Owing to their standard load-dependent dimensioning, the rotor blades have a defined profile with fixed parameters, such as for example the profile depth with associated profile polars. This defined profile forms the basis for the load calculation and the calculation of the annual energy production (AEP).

The design of the rotor blade or rotor blades is an important aspect for the emissions and the efficiency of the wind turbine. The rotor blades of a wind turbine usually have a suction side and a pressure side. The suction side and the pressure side converge at the rotor blade trailing edge of the rotor blade. The difference in pressure between the suction side and the pressure side can result in the generation of vortices, which may ensure an emission of noise and a reduction in power at the trailing edge of the rotor blade.

The design of a wind turbine or the resulting formation of the rotor blades is predominantly oriented toward a standardized location or a standardized load, wherein location-specific verifications/loads may also be involved. In this way, the rotor blades are defined in terms of their later geometrical configuration. In particular, the rotor blades have a fixed geometry, which is no longer amenable to later adaptation with respect to torsion or profile depth during the production process.

BRIEF SUMMARY

Provided are techniques that further increases the effectiveness of a rotor blade of a wind turbine.

A rotor blade of a rotor of a wind turbine is proposed. The rotor blade has a rotor blade trailing edge which extends between a rotor blade root and a rotor blade over a rotor blade length, and has a profile depth which is established between the rotor blade trailing edge and a rotor blade leading edge. For the purpose of improving the efficiency, the rotor blade has at least one profile element having a continuous profile section, which profile element, for the purpose of changing the profile depth of the rotor blade, is able to be attached at or in the region of the rotor blade trailing edge, and the extension of which profile element beyond the rotor blade trailing edge is determined in a manner dependent on a standardized load-dependent dimensioning of the profile depth of the rotor blade and a load level which is established at an erection location of the wind turbine.

The change in the profile depth is realized by the attachment of the at least one profile element, whose extension is determined on the basis of there being a difference between the standardized load, upon which the dimensioning of the rotor blade was based during the production thereof, and a location-specific, for example measured and/or simulated load level. If the measured location load falls below the standardized load upon which the dimensioning of the rotor blade is based, for example because of a lower air density, overdimensioning is present. Said overdimensioning constitutes a load reserve, of which use is made at least partially by the later change in the profile depth of the rotor blade. On the basis of said overdimensioning, it is possible to determine the permissible profile depth of the rotor blade that is specific to this location, in order to adapt this at a later stage. The attachment of the at least one profile element changes the profile depth of the rotor blade according to the extent of the profile element. The continuous profile section of the profile element may extend in a constant or variable manner in the profile depth direction. The at least one profile element makes it possible to provide a larger surface acted on by the wind at the existing rotor blade, this being associated with an increase in power through targeted utilization of the available load reserve.

For increasing the surface acted on by the wind or increasing the profile depth by way of the at least one profile element, various configurations thereof are conceivable. The respective extent of the at least one profile element is determined in a manner dependent on the respective location-dependent load reserve of the wind turbine.

Preferably, the at least one profile element may extend at least sectionally over the rotor blade length. A single profile element extending continuously over the entire rotor blade length has the advantage that fewer transitions between this and the rotor blade, at which undesirable swirling can occur, are present. On the other hand, the provision of two or more profile elements is advantageous since these are easier to realize in terms of production. Moreover, the fitting to the rotor blades is able to be provided more easily. Preferably, the at least one profile element is arranged normal to the contour of the rotor blade trailing edge.

In one preferred embodiment, the at least one profile element, in the extension of the rotor blade trailing edge, has a narrowing contour. Here, the narrowing contour substantially follows the cross-sectional contour of the rotor blade, that is to say forms for example an extension of a profile section of the rotor blade profile beyond the rotor blade trailing edge that narrows to a point.

In one preferred embodiment, the at least one profile element, in the extension of the rotor blade trailing edge, has a constant contour. For this purpose, the at least one profile element may be designed as a plate with constant thickness. It is also advantageously possible to realize combinations of a narrowing contour and constant contour and/or also widening contour in other embodiments. With regard to a constant thickness, alternatively or additionally, for example sectionally, the profile element may have, in the extension of the rotor blade trailing edge, a decreasing thickness, that is to say a narrowing contour.

The rotor blade trailing edge may be of sharp or blunt form, that is to say the rotor blade may have a flat back contour. The at least one profile element may be arranged directly on the trailing edge, in particular in the case of a blunt trailing edge, or in the region of the trailing edge, in particular on the pressure and/or the suction side.

Preferably, the profile element extending at least sectionally over the rotor blade length may have a contour which is sectionally twisted with respect to the longitudinal axis of the rotor blade. The at least one profile element follows the twisting of the rotor blade. The specific aerodynamic properties of the original rotor blade are thus at least substantially maintained despite the change in the profile depth.

Preferably, the extent of the profile element extending at least sectionally over the rotor blade length may vary in a manner dependent on the profile depth of the rotor blade. The width of the profile element may vary with the contour of the profile depth of the rotor blade, in order to maintain the aerodynamic characteristic of the rotor blade. As an alternative or in addition to a dependency on the profile depth of the rotor blade, the extent may depend on a position in the radius direction of the rotor.

In a particularly preferred embodiment, the profile element is of multi-part form and has a section which, in the extension of the rotor blade trailing edge, adjoins the profile section and which has an interrupted contour. The profile element is particularly preferably of two-part form. The profile section is, as has already been stated in this regard, preferably designed as a plate. The section adjoined thereto may be of single-part or multi-part form. The interrupted contour of the section is preferably of serrated form. The serrated configuration helps to improve the flow behavior at the rotor blade trailing edge. The contour of the section that is interrupted in a serrated manner makes it possible to reduce vortices occurring at the rotor blade trailing edge. Furthermore, such a section can help to reduce the noise emission.

In a particularly preferred embodiment, the at least one profile element is of single-part form and has a serrated profile, preferably on the side facing away from the rotor blade trailing edge. For the purpose of achieving an increase in profile depth, a depth in the profile depth direction, and/or a width in the rotor blade longitudinal direction, of the serrations is correspondingly varied in a manner dependent on an existing load reserve, in order to adapt the profile depth of the rotor blade to the permissible profile depth specific to this location. Associated with this, the surface of the rotor blade that is acted on by the wind is enlarged. The serrated profile adjoins the profile section of the at least one profile element or forms one part of the profile section, that is to say the profile element has serrations which are adjoined to the profile section in one part.

It is also the case that the contour interrupted in a serrated manner, in the case of the multi-part configuration, and the serrated contour, in the case of the single-part configuration, extends beyond the rotor blade trailing edge, wherein preferably a feature, that is to say in particular length, width and/or shape of the serrations, is determined and optimized in a manner dependent on a standardized load-dependent dimensioning of the profile depth of the rotor blade and a load level which is established at an erection location of the wind turbine.

Furthermore, a wind turbine having at least one rotor blade, preferably having three rotor blades, is proposed.

Furthermore, a method for improving the efficiency of a rotor of a wind turbine is proposed. The rotor comprises at least one rotor blade having a rotor blade trailing edge which extends between a rotor blade root and a rotor blade over a rotor blade length, and has a profile depth which is established between the rotor blade trailing edge and a rotor blade leading edge. In this regard, for the purpose of changing the profile depth of the rotor blade, at least one profile element provided with a continuous profile section is attached at or in the region of the rotor blade trailing edge, the extent of which profile element beyond the rotor blade trailing edge is determined in a manner dependent on a standardized load-dependent dimensioning of the profile depth of the rotor blade and a load level which is established at an erection location of the wind turbine. During the running operation of the wind turbine, information about the conditions occurring is recorded and evaluated in order to be able to deduce the actual load level. By way of the attachment of the at least one profile element, use is able to be made of a load reserve which is established between the design load which is assumed on the basis of the standardized load-dependent dimensioning and the utilization of the wind turbine that is actually determined at the erection location.

The relationships, explanations and advantages according to at least one embodiment of the rotor blade described are consequently obtained.

In particular, with an increasing fall below the standardized load-dependent dimensioning due to the location-specific load level established, a greater extent of the at least one profile element may be selected.

Preferably, the at least one profile element is retrofitted. The specific retrofitting of the rotor blades by way of the at least one profile element results in a larger surface acted on by the wind, with the result that a greater contribution to the annual energy production can be achieved.

BRIEF DESCRIPTION OF THE SEVERAL VIEWS OF THE DRAWINGS

The invention will be explained in more detail below by way of example on the basis of exemplary embodiments with reference to the accompanying figures.

FIG. 3a shows a schematic illustration of a sub-section of a rotor blade trailing edge, with at least one profile element which is arranged thereon.

FIGS. 3b to 3e schematically show different examples of a cross section of the profile element shown in FIG. 3a.

FIG. 4 shows a schematic illustration of a sub-section of a rotor blade trailing edge, with a section which is arranged thereon and which has a serrated contour, prior to a profile depth of the rotor blade being changed.

FIG. 5 shows a schematic illustration of the sub-section of the rotor blade trailing edge as per FIG. 4, with a profile element which is arranged thereon.

FIG. 6 shows a schematic illustration of a sub-section of a rotor blade trailing edge, with a section which is formed as a profile element and which has a serrated contour.

FIG. 7 shows a schematic illustration of the sub-section of the rotor blade trailing edge as per FIG. 6.

DETAILED DESCRIPTION

It should be noted that the same designations may possibly denote elements that are similar, but not identical, also of different embodiments.

The explanation of the invention on the basis of examples with reference to the figures is substantially schematic, and, for the sake of better illustration, the elements which are explained in the respective figure may be exaggerated in it and other elements may be simplified. Thus, for example, FIG. 1 schematically illustrates a wind turbine such that the provided serrated trailing edge on the rotor blade cannot be clearly seen.

Figure 1:
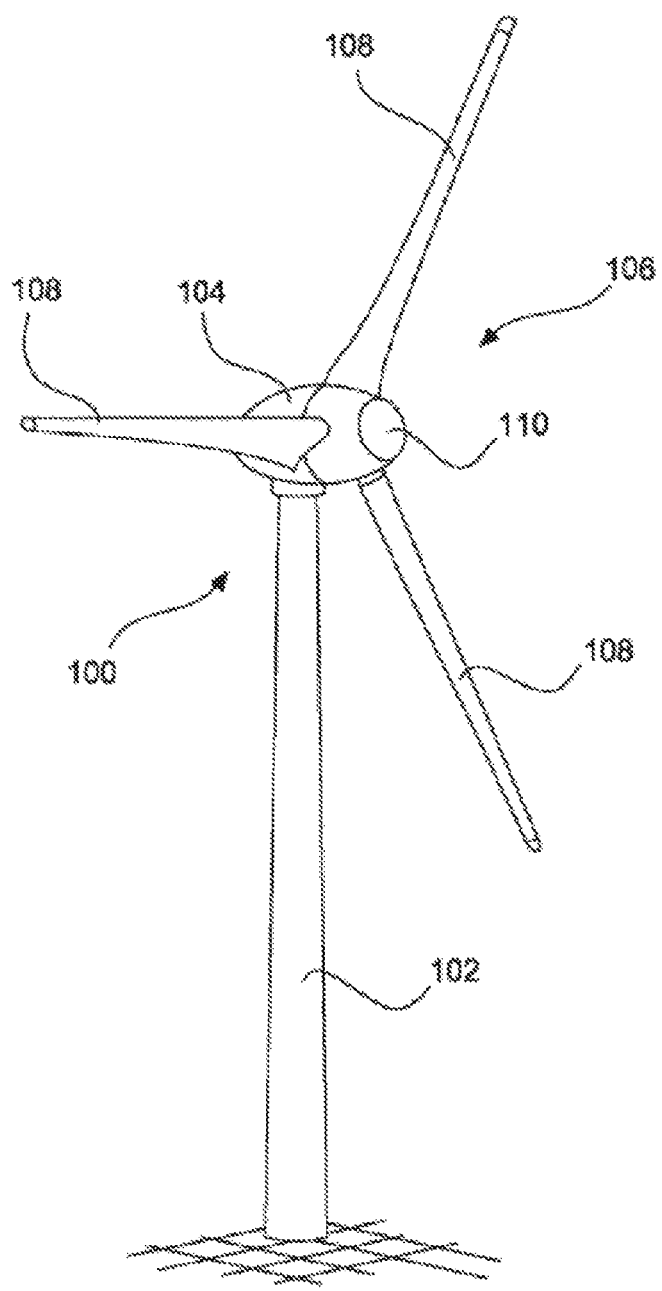
FIG. 1 schematically shows a wind turbine in a perspective view.

FIG. 1 shows a wind turbine 100 having a tower 102 and having a nacelle 104. A rotor 106 having three rotor blades 108 and having a spinner 110 is arranged on the nacelle 104. During operation, the rotor 106 is set in rotational motion by the wind and in this way drives a generator in the nacelle 104.

Figure 2:
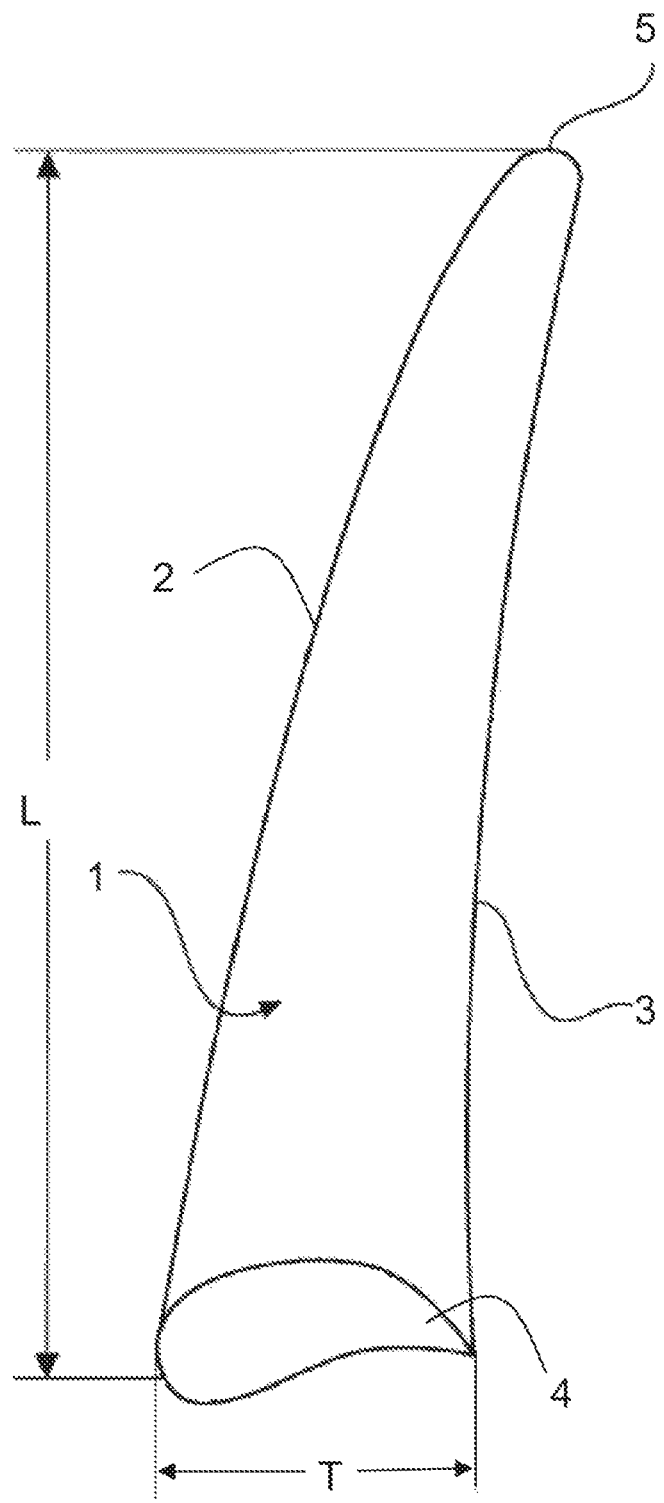
FIG. 2 shows a schematic view of a rotor blade with a rotor blade leading edge and a rotor blade trailing edge.

FIG. 2 shows a schematic view of a rotor blade 1 with a rotor blade leading edge 2 and a rotor blade trailing edge 3. The rotor blade 1 extends from a rotor blade root 4 to a rotor blade tip 5. The length between the rotor blade tip 5 and the rotor blade root 4 is referred to as the rotor blade length L. The distance between the rotor blade leading edge 2 and the rotor blade trailing edge 3 is referred to as the profile depth T. That surface of the rotor blade 1 acted on by the wind is essentially determined by the rotor blade length L and the profile depth T.

FIG. 3a shows a schematic illustration of a sub-section of a rotor blade trailing edge 3, with at least one profile element 6 which is arranged thereon. The profile element 6 has a plate-like profile section 7. The profile section 7, in the extension of the rotor blade trailing edge 3, has a narrowing cross-sectional contour, as is shown for example in FIGS. 3c to 3e. FIG. 3c shows a cross-sectional contour which narrows uniformly from the pressure side and the suction side, whereas FIGS. 3d and 3e show cross-sectional contours which show narrowing only from one of the sides of the profile element 6, that is to say from the pressure-side or the suction-side surface. Alternatively or sectionally, the profile section 7 may also additionally have a constant cross-sectional contour in the extension of the rotor blade trailing edge 3. For this purpose, the profile section 7 may have a substantially cuboidal cross-section, as is shown schematically in FIG. 3b. Other cross-sectional contours, for example concave, convex and the like, and combinations of the contours shown are also conceivable.

The profile element 6 is adapted to the contour of the rotor blade trailing edge 3 in the longitudinal direction of the rotor blade 1, with the result that said profile element follows a contour of the rotor blade trailing edge 3 that is curved, and also that is twisted within itself. The profile element 6 forms a sectional extension of the rotor blade trailing edge 3.

An extent of the profile section 7 beyond the rotor blade trailing edge 3, which leads to an increase in the profile depth T when the profile element 6 is arranged on the rotor blade trailing edge 3 at a later stage, is denoted by ΔT. Here, the extent ΔT of the profile section 6 extending at least sectionally over the rotor blade length L can vary for example in a manner dependent on the profile depth T of the rotor blade 1. In the illustrated embodiment, the profile element 6 is of single-part form and extends at least sectionally over the rotor blade length L. A segmented arrangement of multiple profile elements 6 is also conceivable. For this purpose, multiple profile elements 6 are arranged one next to the other on the rotor blade trailing edge 3. In this case, the transitions between the multiple profile elements 6 are preferably of scarfed form, with other configurations of the transitions also being possible.

FIG. 4 shows a schematic illustration of a sub-section of a rotor blade trailing edge 3, with a section 8 which is arranged thereon and which has a serrated contour, prior to the profile depth T of the rotor blade 1 being changed. The section 8 is arranged normal to the rotor blade trailing edge 3, that is to say said section substantially forms a continuation of the profile chord of the rotor blade 1. The section 8, which is provided with serrations 9, serves for improving the flow behavior at the rotor blade trailing edge 3. The distance between a serration tip 12, as outermost point of the serrations 9, and the beginning of the rotor blade trailing edge 3 is denoted by the reference sign Z. A lowest point, situated in each case between two adjacent serrations 9, is referred to as a serration base 11. The distance Z comprises the region between that side of the section 8 which faces the rotor blade trailing edge 3, that is to say the beginning of the section 8, and the serration base 11, and also the distance between the serration base 11 and the serration tip 12. The respective distance between the serration base 11 and the serration tip 12 of a serration 9 is referred to as the serration height H. The serration height H and/or a distance between two serrations 9 and/or a shape of the serrations 9 themselves may vary along the contour of the rotor blade trailing edge 3. In this example, the section 8 is shown having a serrated contour which extends in a V-shaped manner. As an alternative or in addition to the illustrated shape extending in a V-shaped manner, completely or partially rounded contours right through to sinusoidal contours are also conceivable.

FIG. 5 shows a schematic illustration of the sub-section of the rotor blade trailing edge 3 as per FIG. 4, with a profile element 6 which is arranged thereon and which is adjoined by the serrated section 8. The profile element 6 is arranged between the rotor blade trailing edge 3 and the serrated section 8. The extent ΔT or width of the profile section 7 determines the change in the profile depth T of the rotor blade 1. The serrated section 8 adjoining the profile section 7 may be arranged on the profile element 6 likewise at a later stage. A configuration in which the section 8 is a constituent part of the profile element 6 is preferable.

FIG. 6 shows a schematic illustration of a sub-section of a rotor blade trailing edge 3, with a section 8 which is formed as a profile element and which has a serrated contour, prior to the profile depth T of the rotor blade 1 being changed.

FIG. 7 shows a schematic illustration of the sub-section of the rotor blade trailing edge 3 as per FIG. 6. In this embodiment, a section 8' which has changed in terms of its geometrical dimensions and which has a serrated contour itself forms the profile element 6. For the purpose of changing the profile depth T of the rotor blade 1, provision is made for the distance Z to be enlarged by an extent ΔT. For this purpose, provision is made in the region between the beginning of the section 8' and the serration base 11 of an additional spacing 10 acting as the profile section 7. An alternative to this makes provision for the serration height H and/or width to be enlarged while the distance between the serration base 11 and the beginning of the section 8' remains the same. For the purpose of changing the profile depth T, the section 8 arranged on the rotor blade trailing edge 3 is replaced by a section 8'.

The design of the wind turbine 100 or the dimensioning and configuration of the rotor blades 1 is orientated toward a standardized location or a standardized load. This takes into consideration load peaks which occur, in order to ensure the operational reliability of the wind turbine. In this way, the rotor blades 1 are defined in terms of their later geometrical configuration. Consequently, the rotor blades 1 have a fixed geometry, which is no longer amenable to later adaptation with respect to its torsion or profile depth T during the production process.

For the design of the rotor blades, standard parameters are involved in the dimensioning of the wind turbine, which dimensioning is dependent on a standardized load but is not location-specific. The standard parameters are inter alia shear, the occurrence of turbulence, climatic conditions, air density, and reference speeds for wind classes and wind zones. The rotor blades 1 are dimensioned on the basis of this information for the purpose of providing for an appropriate level of protection against damage arising from risks during the planned lifetime of the wind turbine. The operating conditions actually occurring frequently deviate from said standard parameters upon which the design is based. Load reserves can therefore arise, for example owing to a lower wind density than that upon which the design of the rotor blades 1 was based. Said load reserve, which results from overdimensioning, is used as a parameter for the determination of the permissible profile depth T of the rotor blades 1 that is specific the to this location. If the permissible profile depth T specific to the location has been determined on the basis of the load actually occurring, it is possible to determine from this the possible additional extent ΔT of the profile element 6. The surface acted on by the wind, which results from the rotor blade length and also the profile depth of the rotor blade 1 and the extent ΔT of the profile element, will thus be adapted in a location-specific manner in order to optimize the annual energy production of the wind turbine.

It should be noted that the profile element 6 may of course also have further advantageous uses and is thus not limited to load optimization. For example, use may be made of the configuration for optimizing the induction factor distribution by means of one or more profile elements 6. For this purpose, it is often the case that (cf. for example "Strömungsbeeinflussung bei Rotorblättern von Windenergieanlagen mit Schwerpunkt auf Grenzschichtabsaugung" ["Flow influence at rotor blades of wind turbines with a focus on boundary layer suction"], B. Souza Heinzelmann, http://dx.doi.org/10.14279/depositonce-2975), consideration is made of an axial induction factor a and a radial induction factor a', which express the efficiency of the rotor by way of the axial or radial deceleration of the air flow in the rotor plane. Using the wind speed $u_1$ far from the rotor plane and the wind speed $u_2$ in the rotor plane, the axial induction factor a is defined as follows:

$$a = 1 - \frac{u_2}{u_1}$$

The optimum operating point is characterized in an ideal case by a value of ⅓ for a. If the local tip speed ratio $\lambda_{lokal}$ is introduced at a local radius position, the tangential induction factor a' can be defined as follows:

$$a' = \frac{a \cdot (1-a)}{\lambda_{lokal}^2}$$

The invention claimed is:

1. A rotor blade of a rotor of a wind turbine, comprising:
   a rotor blade root;
   a rotor blade tip;
   a rotor blade trailing edge extending between the rotor blade root and the rotor blade tip over a rotor blade length;
   a profile depth between a rotor blade leading edge and the rotor blade trailing edge; and
   at least one profile element having a continuous profile section, the at least one profile element being coupled to a surface of the rotor blade trailing edge and changing the profile depth of the rotor blade, wherein the at least one profile element has a length beyond the rotor blade trailing edge that is determined based on a difference between a normalized load based on a dimension of the profile depth of the rotor blade at a time of manufacture and a location-specific load level established at an erection location of the wind turbine.

2. The rotor blade as claimed in claim 1, wherein the at least one profile element extends at least partially over the rotor blade length.

3. The rotor blade as claimed in claim 1, wherein the at least one profile element has a narrowing contour in a direction of the rotor blade trailing edge.

4. The rotor blade as claimed in claim 1, wherein the at least one profile element has a constant contour in a direction of the rotor blade trailing edge.

5. The rotor blade as claimed in claim 1, wherein the at least one profile element has at least a portion having a contour that is partially twisted with respect to a longitudinal axis of the rotor blade.

6. The rotor blade as claimed in claim 1, wherein the length of the at least one profile element extending at least partially over the rotor blade length and varies in a manner dependent on the profile depth of the rotor blade.

7. The rotor blade as claimed in claim 1, wherein the at least one profile element includes a first portion and a second portion, wherein the second portion connects to the first portion at a joint that extends along at least a portion of the rotor blade length, wherein the second portion has an interrupted contour, wherein the first portion is coupled to the surface of the rotor blade trailing edge.

8. The rotor blade as claimed in claim 7, wherein the second portion has a serrated contour.

9. The rotor blade as claimed in claim 1, wherein the at least one profile element is a single integral part and has a serrated contour.

10. A wind turbine comprising:
    a rotor; and
    at least one rotor blade coupled to a hub, the at least one rotor blade being the rotor blade as claimed in claim 1.

11. A method comprising:
    establishing a load level of a rotor blade at an erection location of a wind turbine;
    determining a dimension of at least one profile element to be attached to the rotor blade at the rotor blade trailing edge, wherein the dimension is determined based on a difference between a normalized load based on a standardized load-dependent dimensioning of a profile depth of the rotor blade at a time of manufacture and a location-specific load level; and
    attaching the at least one profile element to a surface of a rotor blade trailing edge of the rotor blade, the rotor blade having a rotor blade trailing edge extending between a rotor blade root and a rotor blade tip over a rotor blade length, the profile depth being between a rotor blade leading edge and the rotor blade trailing edge, the at least one profile element having a continuous profile section and being attached to the surface of the rotor blade trailing edge for the purpose of changing the profile depth.

12. The method as claimed in claim 11, wherein, with an increasing fall below the load-dependent dimensioning due to the load level established, a greater dimension of the at least one profile element is selected.

13. The method as claimed in claim 11, wherein the at least one profile element is retrofitted to the rotor blade.

* * * * *